US007564501B2

United States Patent
Miyazawa

(10) Patent No.: US 7,564,501 B2
(45) Date of Patent: Jul. 21, 2009

(54) PROJECTION SYSTEM, PROJECTOR, METHOD OF CONTROLLING PROJECTORS AND PROGRAM THEREFOR

(75) Inventor: Yasunaga Miyazawa, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 760 days.

(21) Appl. No.: 11/354,189

(22) Filed: Feb. 15, 2006

(65) Prior Publication Data

US 2006/0187299 A1 Aug. 24, 2006

(30) Foreign Application Priority Data

Feb. 23, 2005 (JP) ............................. 2005-046587

(51) Int. Cl.
*H04N 5/66* (2006.01)
*H04N 9/12* (2006.01)

(52) U.S. Cl. ...................... 348/383; 348/750; 345/1.3

(58) Field of Classification Search ................ 348/383, 348/744–757; 345/1.3, 589; 353/94, 73
See application file for complete search history.

(56) References Cited

U.S. PATENT DOCUMENTS 6,695,451 B1 2/2004 Yamasaki et al.

7,292,207 B1 * 11/2007 Naegle et al. ................ 345/1.3
2001/0013904 A1 * 8/2001 Kubota et al. ................ 348/383

FOREIGN PATENT DOCUMENTS

| JP | A 06-178327 | 6/1994 |
|---|---|---|
| JP | A 09-326981 | 12/1997 |
| JP | A 2001-222269 | 8/2001 |
| JP | A 2001-251651 | 9/2001 |
| JP | A 2001-339672 | 12/2001 |
| WO | WO 99/31877 | 6/1999 |

* cited by examiner

*Primary Examiner*—M. Lee
(74) *Attorney, Agent, or Firm*—Oliff & Berridge PLC

(57) ABSTRACT

A projection system being composed of a plurality of projectors for performing a tiling projection with the plurality of projectors including: arrangement information generating section that generates arrangement information relating to an arrangement position of the respective projectors at the time of the tiling projection; overlap information generating section that generates overlap information relating to ranges of mutually overlapped areas of projected images; and write start position calculating section that calculates write start positions of the image information in the respective projectors on the basis of the arrangement information and the overlap information so that the image information is written also in the mutually overlapped areas of the projected images at the same timing when the respective projectors start writing of the image information of the amounts corresponding to one frame to light modulating elements at the same timing.

3 Claims, 8 Drawing Sheets

PROJECTION SYSTEM, PROJECTOR, METHOD OF CONTROLLING PROJECTORS AND PROGRAM THEREFOR

BACKGROUND

1. Technical Field

The present invention relates to a projection system, a projector, a method of controlling the projectors, and a program therefor.

2. Related Art

In the related art, a tiling projection that projects a plurality of projected images arranged on a screen using a plurality of projectors (projection image display apparatus) (for example, see patent document JP-A-6-178327; JP-A-9-326981; JP-A-2001-339672; Pamphlet of International Publication No. 99/31877; JP-A-2001-251651).

In the tiling projection, images to be projected by the respective projectors are projected in temporal synchronization in some way. In each projector, image information is written in sequence from an uppermost scan line with a vertical synchronous signal and a horizontal synchronous signal. Therefore, when displaying images so as to be arranged one on top of another, wiring of an area where the upper image and a lower image are overlapped with each other is shifted by approximately one vertical sync. When information of a new frame is being written in the lower image, the image of one frame before is still written in the upper image.

Therefore, in the tiling projection in which the images are projected one on top of another, there is a problem such that a difference of approximately one frame occurs in writing in the overlapped area and hence image information of the different frames are displayed on the same area. In particular, when an image of high speed movement is projected, the image on the overlapped area is disadvantageously defocused. Even though it is short in terms of duration and hence it does not become an issue, a shift by one horizontal cycle occurs in the overlapped area also in the tiling projection in which the images are arranged side by side.

Therefore, as a method of solving the problem occurred in the overlapped area of the upper and lower images, the following method is proposed.

In other words, the write timing of the lower image is delayed so that writing of the lower image starts when writing of the upper image reaches the overlapped area, whereby display of the image information of the different frames in the overlapped area is prevented (For example, see JP-A-2001-222269.

However, with the method disclosed in JP-A-2001-222269, a delay of an amount corresponding to about one frame occurs even with only two images of upper and lower screens. Therefore, for example, in the case in which a big screen display is produced using four projections in the vertical direction and four projections in the lateral direction, that is, sixteen (4×4) projections in total, a display of the amount corresponding to four frame occurs between the uppermost screen and the lowermost screen, and hence a projected image which gives a very strange feeling results as a whole.

SUMMARY

An advantage of some aspects of the invention is to provide a projection system, a projector, a method of controlling the projector, and a program that can realize an image without giving a strange feeling when the tiling projection is performed.

A projection system according to an aspect of the invention is a projection system for performing a tiling projection with the plurality of projectors including: arrangement information generating section that generates arrangement information relating to an arrangement position of the respective projectors at the time of the tiling projection; overlap information generating section that generates overlap information relating to ranges of mutually overlapped areas of projected images; and write start position calculating section that calculates write start positions of the image information in the respective projectors on the basis of the arrangement information and the overlap information so that the image information is written also in the mutually overlapped areas of the projected images at the same timing when the respective projectors start writing of the image information of the amounts corresponding to one frame to light modulating elements.

A projector according to an aspect of the invention is a projector used for a tiling projection including: arrangement information generating section that generates arrangement information relating to the arrangement position of its own when the tiling projection is performed; and write start position calculating section that calculates write start position of the image information of its own on the basis of the arrangement information and the overlap information relating to ranges of the mutually overlapped areas of the projected images so that the image information is written also in the mutually overlapped areas of the projected images at the same timing when the projector starts writing of the image information of the amount corresponding to one frame simultaneously with other projectors.

A method of controlling the projector according to an aspect of the invention is a method of controlling projectors used for the tiling projection including generating arrangement information relating to an arrangement position of its own when the tiling projection is performed; and calculating write start position of the image information of its own on the basis of the arrangement information and the overlap information relating to ranges of the mutually overlapped areas of the projected images so that the image information is written also in the mutually overlapped areas of the projected images at the same timing when the projector starts writing of the image information of the amount corresponding to one frame simultaneously with other projectors.

A program according to an aspect of the invention is a program used for a projection system being composed of a plurality of projectors and performing a tiling projection with the plurality of projectors, and the program causes a computer to execute functions of: arrangement information generating section that generates arrangement information relating to arrangement positions of the respective projectors when the tiling projection is performed; overlap information generating section that generates overlap information relating to ranges of mutually overlapped areas of projected images; and write start position calculating section that calculates write start positions of the image information in the respective projectors on the basis of the arrangement information and the overlap information so that the image information is written also in the mutually overlapped areas of the projected images at the same timing when the respective projectors start writing of the image information of the amounts corresponding to one frame to light modulating elements.

In the respective aspects of the invention as described above, since writing of the image information of each images can be started simultaneously, writing of the image information of an amount corresponding to one frame can be completed in one-frame cycles and, in addition, writing can be performed at the same timing also in the overlapped areas where the images are overlapped with each other. Therefore, the images in the overlapped areas can be prevented from being defocused and hence an image without giving a strange feeling is achieved.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
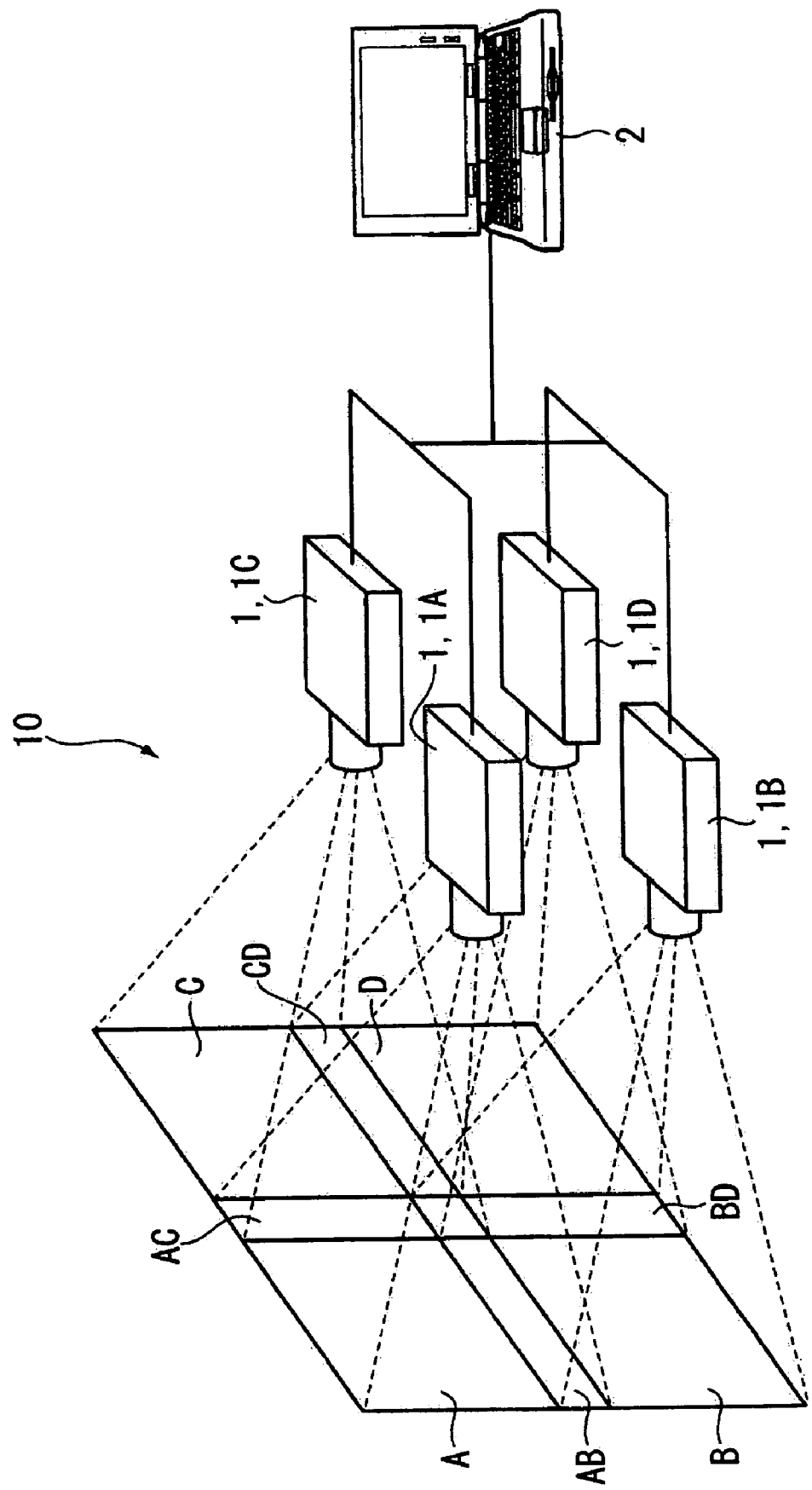
FIG. 1 is a rough sketch of a projection system in a state of performing a tiling projection according to a first embodiment.

Referring now to the drawings, a first embodiment of the invention will be described.

Figure 2:
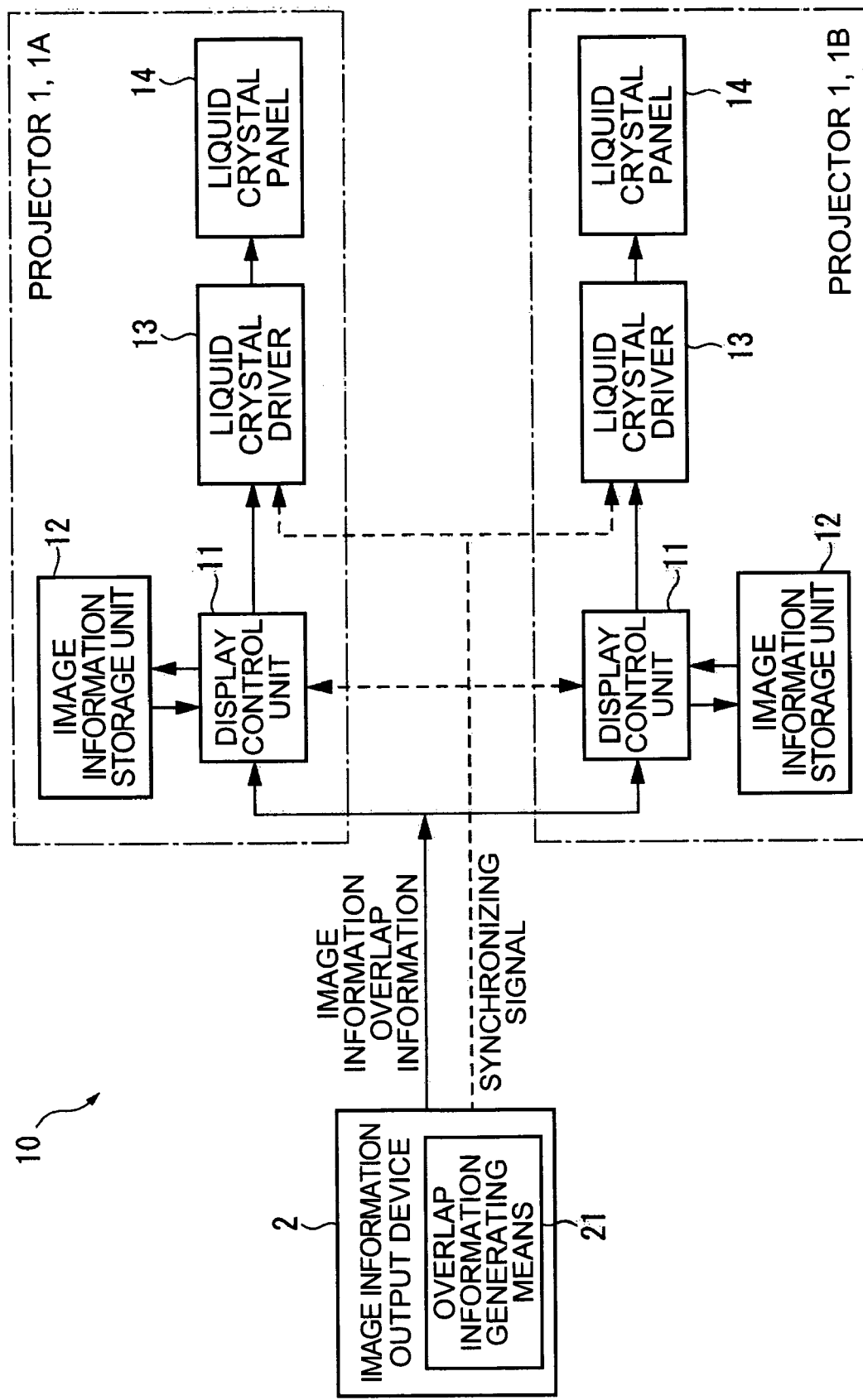
FIG. 2 is a block diagram showing a projector and an image information output device of the projection system.
Figure 3:
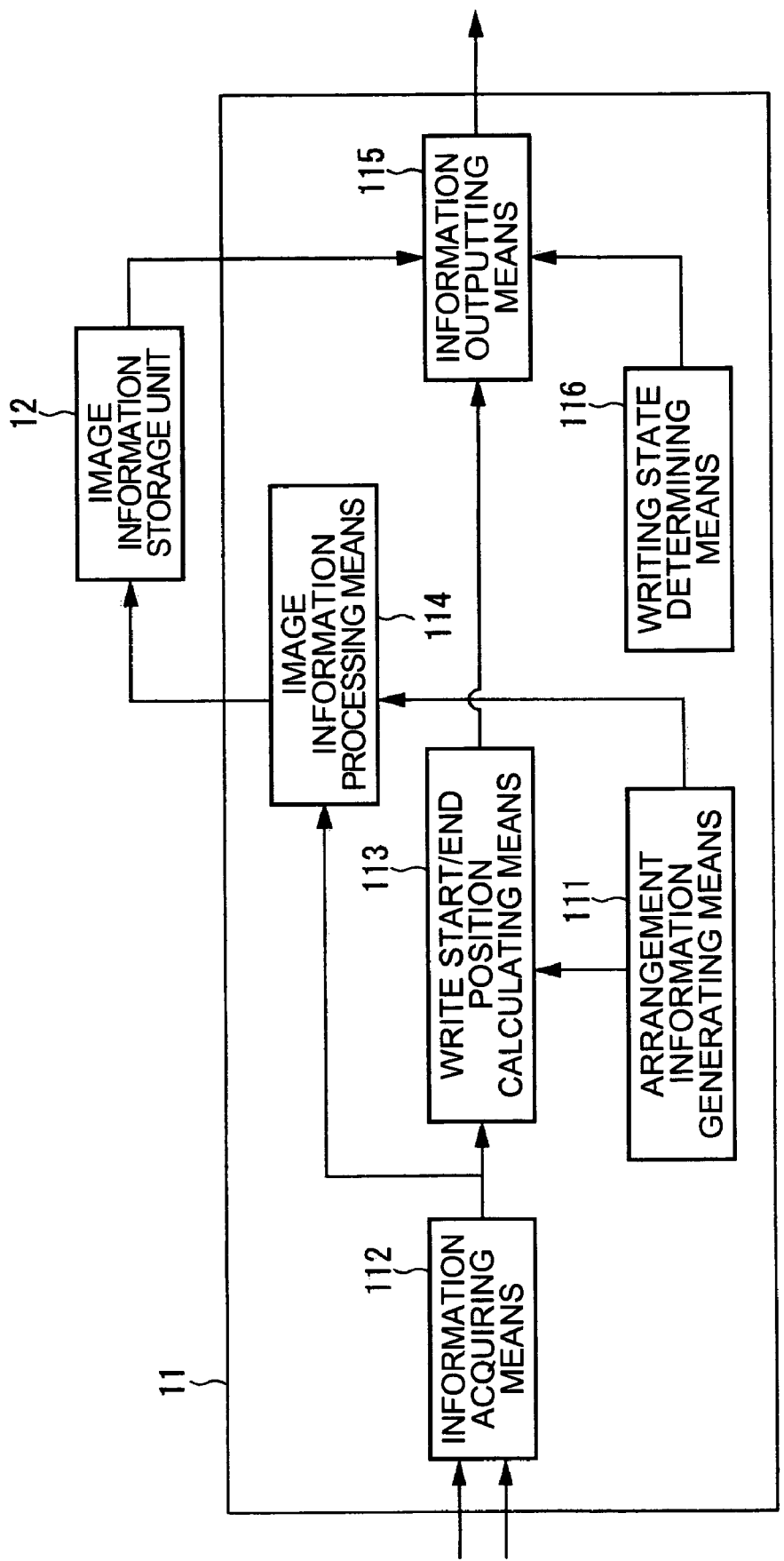
FIG. 3 is a block diagram showing a principal portion of the projector.

FIG. 1 is a rough sketch of a projection system 10 in a state of performing a tiling projection according to the first embodiment; FIG. 2 is a block diagram showing a projector 1 (1A and 1B) and an image information output device 2 of the projection system 10; and FIG. 3 is a block diagram showing a principal portion of the projector 1.

In FIG. 1, the projection system 10 is a system for performing the tiling projection using a plurality of (in this embodiment, upper and lower two projectors on the left and right sides; totally four projectors) projectors 1 (1A to 1C), in which writing of image information in overlapped areas of projected images A to D from the respective projectors 1A to 1C, in particular, overlapped areas AB, CD overlapped in the vertical direction is started simultaneously to display the respective projected images A to D at the same frame cycle thereby realizing a big screen display without giving a strange feeling.

The projection system 10 of this type includes the projectors 1A to 1D and an image information output device 2 for outputting image information of the contents to be displayed thereby.

The image information output device 2 is composed of a personal computer or the like, and has normal functions that general personal computers have and, as shown in FIG. 2, an executable program (software) for causing the computer to function as overlap information generating section 21.

The overlap information generating section 21 has a function to create overlap information relating to ranges (size, position, and so on) of the overlapped areas AB, CD, AC and BD of the projected images A to D. The overlap information is composed of two-dimensional coordinate values with a unit of display pixel in a light modulation element of the projector 1. For example, when the projectors 1A to 1D are always positioned accurately, the coordinate values of the areas AB, CD, AC and BD are fixed correspondingly. Therefore, the coordinate values entered with a ten-key numeric keyboard can be used as the overlap information. When the positioning of the projectors 1A to 1D are rough, the projected images A to D in a state in which the projectors 1A to 1D are arranged are picked up, and coordinate values of the areas AB, CD, AC and BD obtained from the picked-up image can be used as the overlap image.

The projector 1, which is shown as a representative of the projectors 1A and 1B, includes a display control unit 11, an image information storage unit 12, a liquid crystal driver 13, a liquid crystal panel 14, and an optical unit, not shown for projecting an optical image formed on the liquid crystal panel 14.

The display control unit 11 has a function to process image information of contents acquired from the image information output device 2 according to the arranged position of itself, and output the processed image information in an optimal wiring sequence. Detail description thereof will be described later.

The image information storage unit 12 is a frame buffer for storing image information of an amount corresponding to one frame, and the stored image information is outputted to the liquid crystal driver 13 in a predetermined sequence from the display control unit 11.

The liquid crystal driver 13 has a function to acquire the image information from the display control unit 11 and writes the image information to the liquid crystal panel 14 in a sequence of acquisition.

The liquid crystal panel 14 constitutes a light modulating element (light valve) and forms an optical image on the basis of the written image information. The light-modulating element used for the projector according to an aspect of the invention is arbitrary, and may be DMD or the like as well as a liquid crystal panel (may be a single panel type and three-panel type) of light transmitting type and light reflecting type.

Referring now to FIG. 3, the display control unit 11 will be described.

The display control unit 11 includes an executable program (software) that causes the computer to function as arrangement information generating section 111, information acquiring section 112, write start/end position calculating section (write start position calculating section) 113, image information processing section 114, information outputting section 115, and writing state determining section 116.

The arrangement information generating section 111 has a function to generate arrangement information about the position of itself out of the four arranged projectors. The arrangement information is generated by the user by entering the vertical and lateral positions as two-dimensional coordinate values for all the four projectors with operating panels or the like provided on the projector 1. Then, the arrangement information is outputted to the write start/end position calculating section 113.

The information acquiring section 112 acquires the image information, the overlap information, and the synchronizing signal from the image information output device 2 and outputs the same to the image information processing section 114.

The write start/end position calculating section 113 determines a position to start writing the image information first and a position to write the same at the end by calculation on the basis of the arrangement information from the arrangement information generating section 111 and the overlap information from the image information output device 2, and outputs calculated results to the information outputting section 115 as start position information and end position information.

Figure 4:
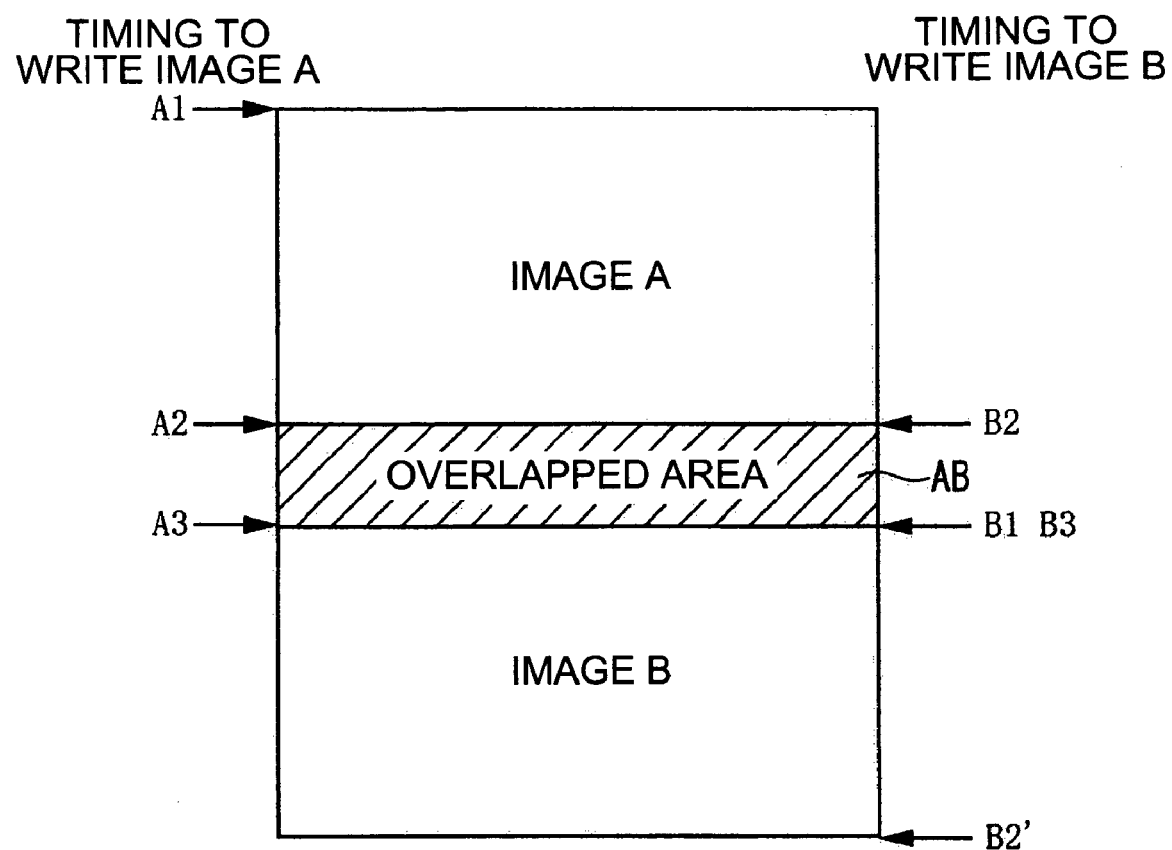
FIG. 4 is an explanatory drawing showing a writing sequence of the image information in a pair of upper and lower screens.

More specifically, as shown in FIG. 4, in a case in which an image A of the projector 1A is projected above, an image B of the projector 1B is projected below, and an overlapped area AB of these images exists, the write start/end position calculating section 113 of the projector 1A determines a position A1 of the uppermost scan line as the write start position of the image A, and determines a position A3 of the lowermost scan line as the write end position. On the other hand, the write start/end position calculating section 113 of the projector 1B determines a position B1 of a scan line immediately below the overlapped area AB as the write start position of the image B, and determines a position B3 of the lowermost scan line of the overlapped area AB as the write end position. In other words, in the image B, the image B is written from B1 to a position B2', which is the lowermost position of the image B, and then is written again from the position B2 of the uppermost scan line to the position B3.

Figure 5:
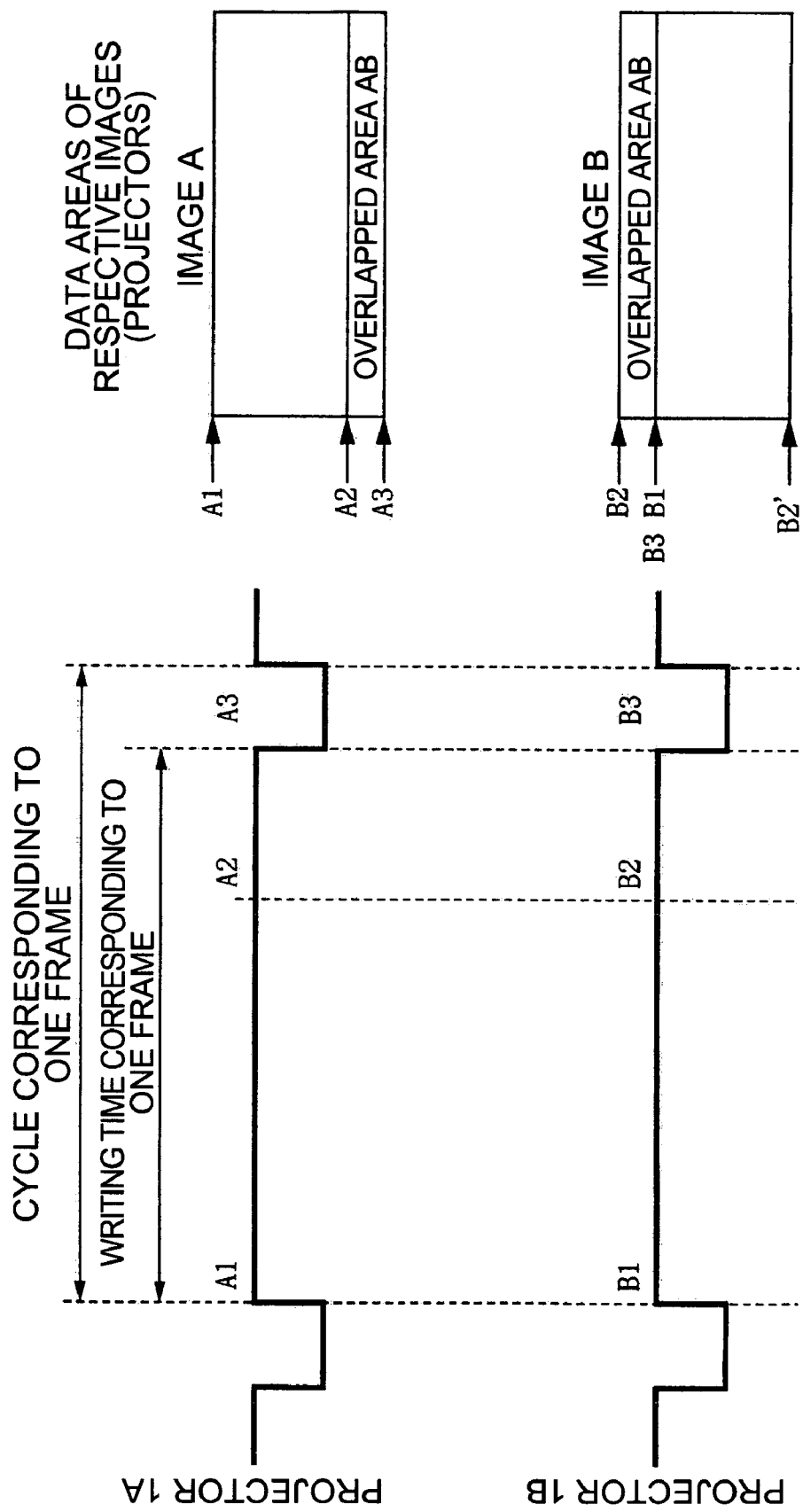
FIG. 5 is a time chart for explaining the writing sequence.

Therefore, by starting writing simultaneously from A1 in the image A and from B1 in the image B, the both images A and B are entirely written in one-frame cycles as shown in FIG. 5, and hence the writing time is the same. Since the writing of the image A in the overlapped area AB is started from A2 and the writing of the image B in the same area is started from B2, writing of the image A and the image B in the area AB is performed simultaneously, so that defocusing of the image can be avoided. Although the reference signs B1 to B3 are indicated on the right side of the drawing in FIG. 4, it is just because of convenience in drawing of a figure, and it does not mean that writing is performed from the right to the left. Writing of the image information is performed from the left to the right for the both images A and B. Although not shown in the drawing, writing of the images C and D is also performed in the same manner as the images A and B.

Returning back to FIG. 3, the image information processing section 114 processes image information for an image in the projected area according to its own arrangement position, and stores the image information of an amount corresponding to one frame in the image information storage unit 12.

The information outputting section 115 acquires image information of the amount corresponding to one frame from the image information storage unit 12 and the start position information from the write start/end position calculating section 113, and outputs the image information in sequence from the start position on the basis of the start position information. Consequently, writing by the liquid crystal driver 13 is performed as described above.

The writing state determining section 116 acquires the end position information from the write start/end position calculating section 113, monitors the position of the image information that the information outputting section 115 outputs. When the image information corresponding to the lowermost position of the pixel area before the image information corresponding to the end position is outputted, it returns back to the uppermost position to cause the corresponding image information to be outputted, and monitors until the image information of the end position is outputted.

Figure 6:
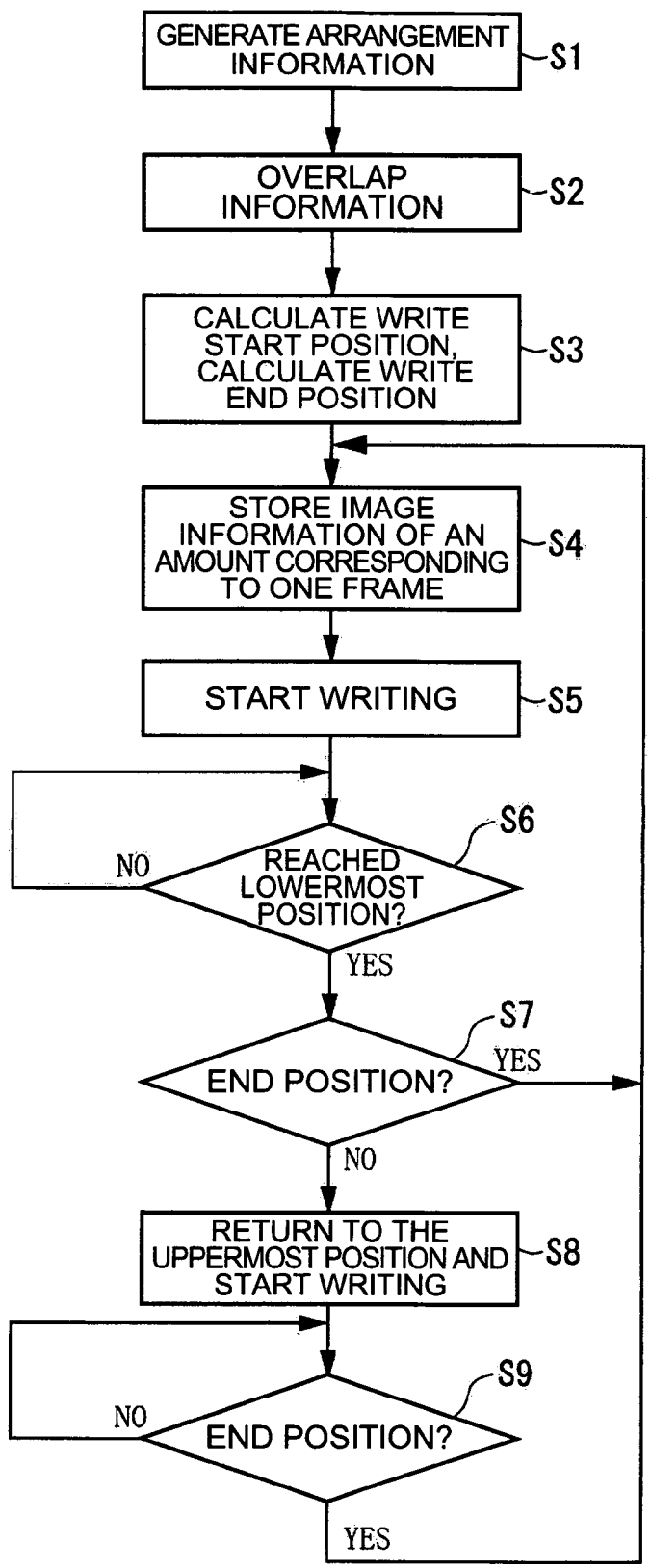
FIG. 6 is a flowchart for explaining an operation of the projector.

Subsequently, referring now to the flowchart in FIG. 6, an operation with the projector 1 (1A to 1D) will be described.

Step S1: The user operates the operating panels or the like for the respective projectors 1A to 1D, and sets their own positions in the entire layout. Then, the arrangement information generating section 111 of the display control unit 11 generates arrangement information on the basis of the set contents, and outputs the same to the write start/end position calculating section 113.

Step S2: The write start/end position calculating section 113 acquires the overlap information from the image information outputting device 2 via the information acquiring section 112.

Step S3: Subsequently, the write start/end position calculating section 113 calculates its own write start position and the write end position on the basis of the arrangement information and the overlap information, and outputs the calculated result to the information outputting section 115 and the writing state determining section 116 as the start position information and the end position information.

Step S4: When actually projecting the image, the image information processing section 114 processes the acquired image information on the basis of the arrangement information, and stores a part of the processed image information corresponding to one frame in the image information storage unit 12.

Step S5: Subsequently, the information outputting section 115 calls the stored image information in sequence on the basis of the start position information, and outputs the same to the liquid crystal driver 13, so that the liquid crystal driver 13 starts writing of the image information.

Step S6: In this case, the writing state determining section 116 monitors whether or not the information outputting section 115 outputs the lowermost image information.

Step S7: When it is determined that the lowermost image information is outputted, the writing state determining section 116 determines whether or not the image information of the end position is outputted on the basis of the end position information. In the case of the images A and C, since the image information on the lowermost scan lines are the image information of the end positions, it means that the image information of the amount corresponding to one frame is outputted in this stage, and hence writing by the liquid crystal driver 13 is also ended. Then, the image information of the amount corresponding to the next one frame is stored, and Steps S4 to S7 are repeated.

Step S8: On the other hand, in the images B and D, output is continued further from the uppermost position even after having outputted the lowermost image information, and hence writing by the liquid crystal driver 13 is also continued.

Step S9: When the writing state determining section 116 determined that the end position is reached, outputting and writing of the image information is ended, and the procedure goes back to S4.

In the procedure described above, the timing when the projectors 1A and 1C start and complete Steps S6 and S7 are the same as the timing when the projectors 1B and 1D start and complete Steps S6 to S9, as a mater of course.

As described above, according to this embodiment, when performing the tiling projection using the projectors 1A to 1D, the write start/end position calculating section 113 determines suitable write start positions for the projectors 1A to 1D on the basis of the arrangement information and the overlap information, and causes writing of the image information in the respective images A to D simultaneously from the start positions. Therefore, writing of the image information of the amount corresponding to one frame can be completed in one-frame cycles and, in addition, writing can be performed at the same timing even in the overlapped areas AB and CD where the images A to D are overlapped in the vertical direction. Therefore, the image in the areas AB and CD is prevented from being defocused, and hence the image that does not give a strange feeling can be realized.

Second Embodiment

Figure 7:
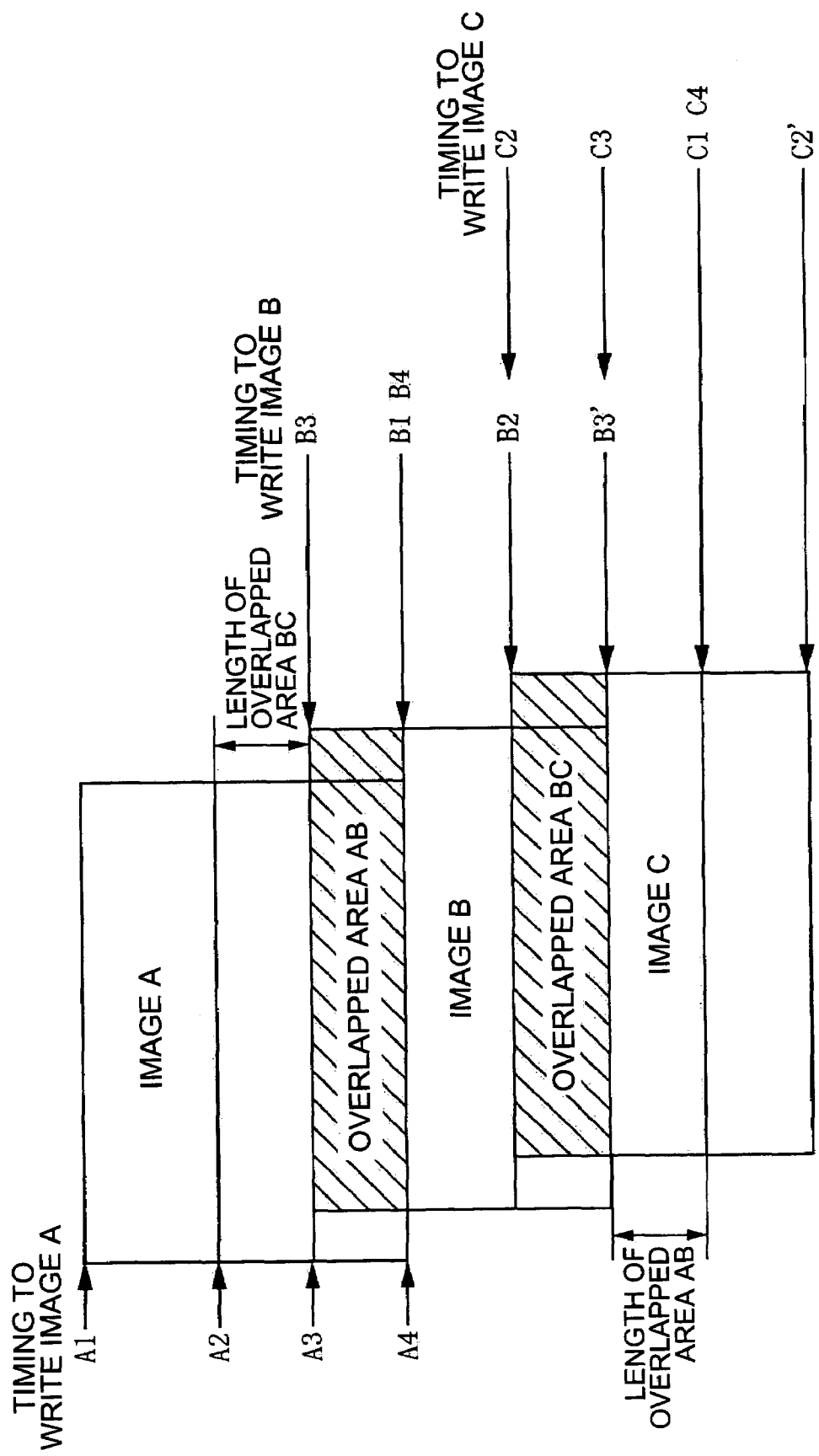
FIG. 7 is an explanatory drawing showing the writing sequence of the image information in a second embodiment of the invention.
Figure 8:
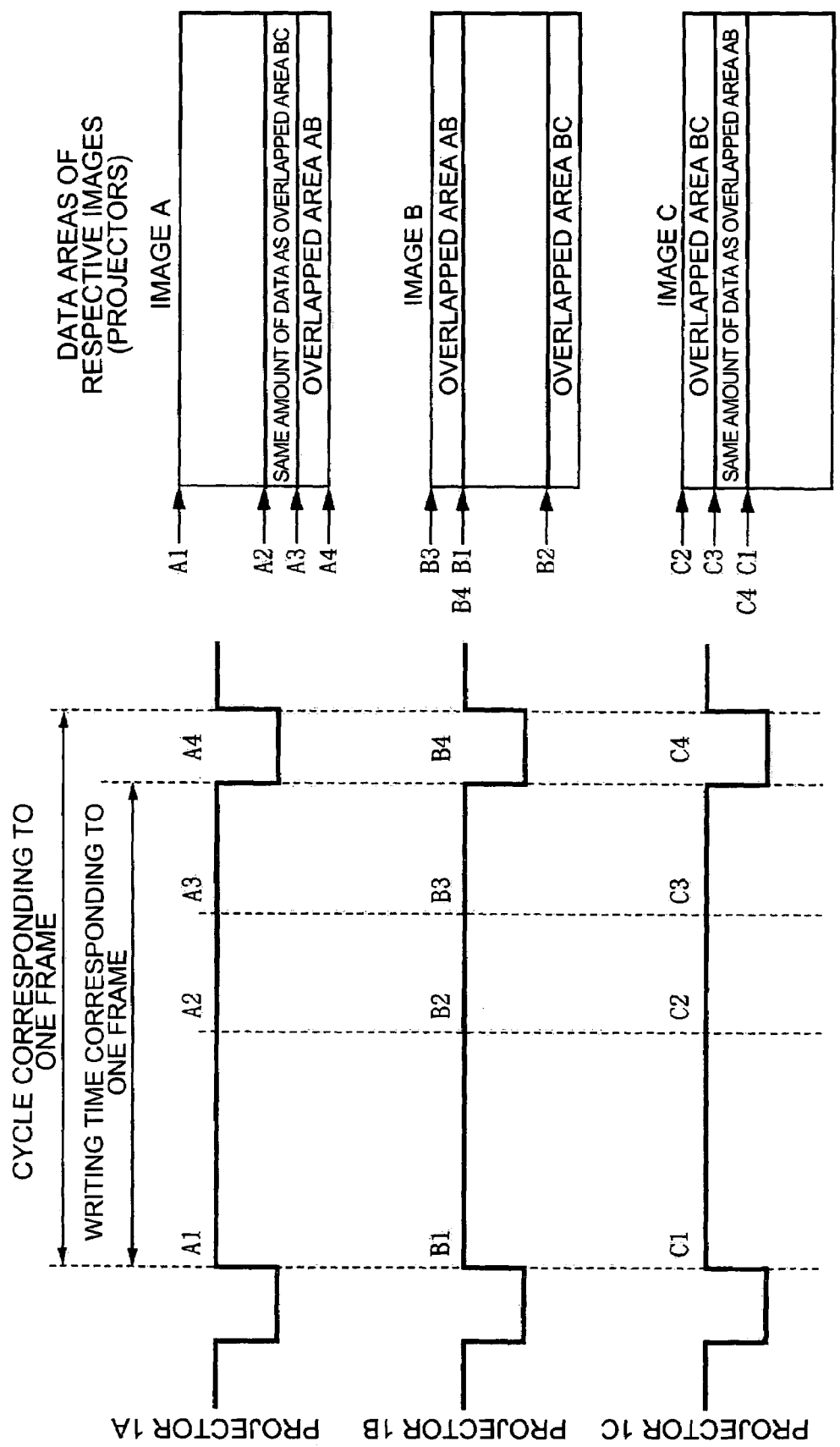
FIG. 8 is a time chart for explaining the writing sequence in the second embodiment.

FIG. 7 shows a state in which the tiling projection is performed with the three projectors 1A to 1C (although not shown, they are designated by the reference numerals 1A to 1C for convenience of description) arranged in the vertical direction. FIG. 8 shows a time chart when the tiling projection is performed. Although the images to be projected from the respective projectors 1A to 1C are shifted in the lateral direction for convenience of drawing the figure in FIG. 7, they are actually projected accurately in line in the vertical direction.

In FIG. 7 and FIG. 8, writing of image A starts from the position A1 of the uppermost scan line and continues until it passes through A2 and A3 and reaches A4 as in the first embodiment. Writing of the image B also starts from the position B1 of the scan line immediately below the overlapped area AB, passes through B2, and B3', returns to the uppermost B3, and is performed from here to the position B4 of the lowermost scan line of the overlapped area AB as in the first embodiment. Therefore, writing of the overlapped area AB in the image A and writing of the overlapped area AB in the image B are performed at the same timing.

In the image C, writing starts from a position C1 which is below the position immediately below the overlapped area BC by an amount corresponding to the length of the overlapped area AB. After having started from C1, when writing reaches the lowermost position C2', in the image B, writing reaches the position B2 before the overlapped area BC. Subsequently, in the image C, returning back to the uppermost position C2, writing of the overlapped area BC is performed therefrom. Simultaneously, writing of the overlapped area BC is performed in the image B. Then, in the image C, writing is performed until the position C3 below of the overlapped area BC and then proceeded to C4, which is before the position C1 and corresponds to the length of the overlapped area AB. At this time, in the image B, returning back to the uppermost position B3, writing of for the overlapped area AB is started and is proceeded to the position B4 below the overlapped area AB.

In other words, in the case in which the tiling projection is performed with the projectors 1A to 1C as well, writing of the overlapped area AB in the image A, writing of the overlapped areas AB, BC in the image B and the writing of the overlapped area BC in the image C are performed at the same timing. The amount of data to be written is the same on the images A to C, the time required for writing one frame is the same, and hence the information of the amount corresponding to one frame can be written reliably in one-frame cycles. The length of the area between the A2 and A3 corresponds to the length of the overlapped area BC.

The invention is not limited to the above-described embodiments, and modifications and improvements in the range which can achieve the advantages of the invention are included in the invention.

For example, simultaneous writing of the overlapped area overlapped in the vertical direction has been described in the first and second embodiments. However, the same writing control may be performed for an overlapped area overlapped in the lateral direction. In particular, in the images A and C in FIG. 1, writing of the image A starts from the leftmost position of the uppermost scan line and writing of the image C starts from a mid-position of the scan line at the same position, that is, from the position immediately left side of the overlapped area AC and, when reached the right end, writing returns to the right end and starts from the left end. When this procedure is ended, the same procedure may be performed for the following scan lines.

In the first and second embodiments, the cases in which two or three projectors are arranged in the vertical direction have been described. However, the projections may be four or more, and the number of the projectors is not limited. For example, in a case in which one projector is added to the tree projectors shown in FIG. 7 below the projector 1C to perform the tiling projection with four projectors arranged in the vertical direction, it is conceivable that writing of an image projected by the fourth projector, which is overlapped with the image C from the projector 1C, is started from the left end of the uppermost position in the same manner as the image A depending on the length of the overlapped area.

In the first and second embodiment, the write start position A1 of the image A is the position of the uppermost scan line. However, the write start position in the image A is not limited and may be changed as desired by changing the write start positions B1, C1 in other images B, C. Therefore, the write start positions in the image B and the image C may be the positions of the uppermost scan line. What is important is, in the invention, to set the write start positions for the respective images so that the write timings are the same for all the overlapped areas.

In the first embodiment, the write start/end position calculating section 113 that calculates the write start position and the write end position is employed as the write start position calculating section according to an aspect of the invention. However, what is essential is that at least the write start position is calculated, and depending on the control method, the end position information may not be used. In this case, calculation of the end position can be eliminated.

In the first embodiment, the arrangement information generating section 111 and the write start/end position calculating section 113 are provided in the projector 1, and the overlap information generating section 21 is provided in the image information output device 2. However, a structure in which a separate write control device is specifically provided between the projector 1 and the image information output device 2, and the arrangement information generating section, the write start/end position calculating section, and the overlap information generating section are provided in this device may be employed. The system including such the write control device is also included in the projection system in the invention. In the write control device, the image information of an amount corresponding to one frame for each projector is outputted synchronously.

The invention may be employed when the tiling projection is performed with a plurality of projectors when performing presentation or establishing a home theater.

The entire disclosure of Japanese Patent Application No. 2005-046587, filed Feb. 23, 2005 is expressly incorporated by reference herein.

What is claimed is:

1. A projection system being composed of a plurality of projectors for performing a tiling projection with the plurality of projectors comprising:
   arrangement information generating section that generates arrangement information relating to an arrangement position of the respective projectors at the time of the tiling projection;
   overlap information generating section that generates overlap information relating to ranges of mutually overlapped areas of projected images; and
   write start position calculating section that calculates write start positions of the image information in the respective projectors on the basis of the arrangement information and the overlap information so that the image information is written also in the mutually overlapped areas of the projected images at the same timing when the respective projectors start writing of the image information of the amounts corresponding to one frame to light modulating elements at the same timing.

2. A projector used for a tiling projection comprising:

arrangement information generating section that generates arrangement information relating to the arranged position of its own when the tiling projection is performed; and write start position calculating section that calculates write start position of the image information of its own on the basis of the arrangement information and overlap information relating to ranges of the mutually overlapped areas of the projected images so that the image information is written also in the overlapped areas of the projected images at the same timing when the projector starts writing of the image information of the amount corresponding to one frame simultaneously with other projectors.

3. A method of controlling projectors used for the tiling projection comprising:

generating arrangement information relating to an arrangement position of its own when the tiling projection is performed; and calculating write start position of the image information of its own on the basis of the arrangement information and overlap information relating to ranges of the mutually overlapped areas of the projected images so that the image information is written also in the overlapped areas of the projected images at the same timing when the projector starts writing of the image information of the amount corresponding to one frame simultaneously with other projectors.

* * * * *